Nov. 30, 1965  G. CARTER ETAL  3,221,228
CERAMIC CAPACITOR AND THE METHOD OF MAKING THE SAME
Filed Sept. 15, 1961
SILVER COATING COMPOSITION
CONTAINING FINELY DIVIDED SILVER AND SnO
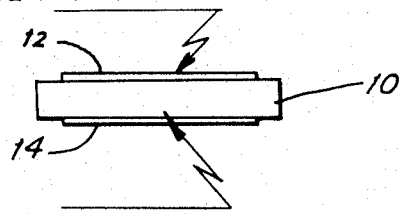
ALKALINE EARTH TITANATES, PARTICULARLY
REDUCED BARIUM TITANATE AND
1% RARE EARTH OXIDE
GERARD CARTER AND
CHARLES E. HODGKINS
INVENTORS
BY Paul S. Martin
ATTORNEY 3,221,228
CERAMIC CAPACITOR AND THE METHOD OF
MAKING THE SAME
Gerard Carter, Mattapoisett, and Charles E. Hodgkins,
New Bedford, Mass., assignors to Cornell-Dubilier
Electric Corporation, a corporation of Delaware
Filed Sept. 15, 1961, Ser. No. 138,285
19 Claims. (Cl. 317—258)

This invention relates to electrical components, and more particularly to capacitors of the type having a high dielectric ceramic body carrying conducting electrodes. It also relates to methods and materials for producing same.

In ceramic capacitors, the ceramic body is required to exhibit as high a dielectric constant as possible, and at the same time to maintain a low power factor. For this reason, a great deal of experimentation has up to the present been directed towards the development of methods and means for producing a ceramic body with these and other desirable properties. A number of these experiments have been sufficiently successful to merit commercial adaptation, among them being the use of a body of ceramic material composed predominantly, i.e. at least 50%, of alkaline earth titanates, particularly barium titanate. Further refinements in developing optimum properties in such alkaline earth titanate ceramic bodies have involved the concomitant use of a variety of additive chemicals, usually metal elements or compounds, of firing techniques requiring selected or predetermined temperatures and environmental conditions, e.g. oxidizing and/or reducing, etc., of pre-firing and post-firing techniques and treatments, solid or hollow bodies with selected shapes and surface configurations being variously utilized.

For the production of various ceramic electrical components, such ceramic bodies of predominantly alkaline earth titanate, including if desired such refinements, have been provided with such conducting electrodes as fired-on silver, fired-on platinum, evaporated zinc, graphite resistor paint, and the like. Attempts at improving the properties and functions of these components have, however, for the most part been implemented by experimentation with ceramic bodies as indicated above.

It is an object of this invention to provide electrical components of the above-described type with improved electrical and/or physical properties. Another object of this invention is the provision of such improved components containing any of the known bodies of ceramic material composed predominantly of alkaline earth titanate with or without the further refinements referred to above. Still another object of this invention is the provision of improved electrical capacitors with relatively increased capacitance. A further object of this invention is the provision of a method or means for producing such improved electrical circuit components requiring a minimum of change in the known production techniques and materials therein employed. A still further object of this invention is the provision of an improved silver coating composition. Other objects and advantages will appear as the description proceeds.

The foregoing objects and others are achieved in a manner more fully described below, in which reference is made to the accompanying drawing.

The drawing is a lateral elevation, greatly enlarged, of a capacitor embodying features of the invention.

In the drawing a ceramic body 10 is shown having adherent electrodes 12 and 14 on opposite surfaces of the ceramic body. The compositions mentioned in the drawing are those present before the firing operation as more fully explained below.

The attainment of the above objects is made possible by my invention which is based upon the discovery that highly improved and unexpected results are obtained when a silver coating composition containing about 3 to 30% of SnO (stannous oxide) is employed in providing at least one surface of a body of high dielectric ceramic material composed predominantly of alkaline earth titanate with a fired-on silver electrode. The present invention accordingly broadly comprises a body of high dielectrode ceramic material composed predominantly of alkaline earth titanate, to at least one surface of which is secured an electrode consisting essentially of silver and about 3 to 30% of $SnO_2$ (stannic oxide) by weight of the silver; a method comprising firing on at least one surface of a body of high dielectric ceramic material composed predominantly of alkaline earth titanate, a composition containing as its essential unburnable constituents silver and about 3 to 30% of SnO by weight of the silver; and a silver coating composition containing as its essential unburnable constituents finely divided silver and about 3 to 30% of finely divided SnO by weight of the silver.

The ceramic bodies of the present invention are well known in the art, and no claim is made thereto per se. They are composed predominantly of magnesium, calcium, strontium, or preferably barium, titanate or any mixture thereof. These titanates constitute from 50 to 100%, preferably about 75 to 95% by weight of the body. A great variety of other metal compounds or elements may be added to the ceramic composition prior to firing, as is disclosed in the prior art, including for example the zirconates, stannates, carbonates, oxides, etc., of the alkaline earth metals, rare earth metals, light and heavy metals. A preferred composition for the ceramic body comprises a major amount of one or a mixture of alkaline earth titanates, a minor amount of one or a mixture of alkaline earth zirconates, and small or trace amounts such as from less than 0.5 up to 5% of thorium oxide or a rare earth oxide such as cerium, lanthanum, neodymium, praseodymium, or cerium oxides, or any mixtures of such oxides.

The foregoing ceramic composition is conventionally mixed with a burnable binder such as wax, cellulose derivative, or natural or synthetic resin, shaped in known manner as by casting, extruding, pressing, centrifugal molding, or the like, and the resulting shaped ceramic composition fired in accordance with known techniques at elevated temperatures to produce the body of high dielectric ceramic material composed predominantly of alkaline earth titanate. During the firing, all burnable constituents of the ceramic composition are removed, whether by sublimation, vaporization, oxidation, chemical reaction or decomposition, or any other mechanism, and it will accordingly be understood that the term "burnable" as employed herein is intended to mean the property of being removable by any mechanism during the elevated firing temperatures employed. It will likewise be understood that the ceramic body may have any desired size, shape or surface configuration, solid, hollow or perforated, including for example sheets, tubes, discs and other symmetrical or unsymmetrical forms and shapes with uniformly or discontinuously smooth or irregular surfaces such as hill and valley or waffle patterns.

As stated, the shaped ceramic composition may be fired in accordance with known techniques. Firing temperatures within the range of about 2100 to 2500° F. are usual, with the ceramic body in uniform or partial contact with an inert, oxidizing, reducing, or other agent, atmosphere or environment during all or part of the firing time. In accordance with a preferred embodiment, the firing is carried out in such manner as to produce a body composed entirely of reduced alkaline earth titanate or, less preferably, a body having a surface layer of oxidized alkaline earth titanate and another surface layer of reduced alkaline earth titanate. A body composed entirely of reduced alkaline earth titanate may be suitably prepared by first firing the body in contact with an oxidizing agent or atmosphere such as oxygen or air, and then refiring the body in contact with a reducing agency or atmosphere such as hydrogen, whereby the body exhibits semi-conducting characteristics throughout. The layerized body may be suitably prepared by firing the body with one surface in contact with an oxidizing agent or atmosphere and another surface in contact with a reducing agency or atmosphere such as carbon or hydrogen, sequentially or simultaneously. It will be understood that the term "reduced alkaline earth titanate" necessarily implies only a partial reduction in known manner, since a complete reduction would yield the free metal titanium.

The electrical components of the present invention are produced by applying to at least one surface of a fired ceramic body as described above a silver coating composition containing as its essential unburnable constituents finely divided silver and about 3 to 30% finely divided SnO by weight of the silver. More particularly, a silver coating composition is preferably employed containing an unburnable content consisting essentially of, by weight, about 80 to 100 parts of finely divided silver, about 3 to 30% of finely divided SnO by weight of the silver, and about 0 to 20 parts of finely divided glass flux, dispersed in a burnable vehicle, the weight ratio of unburnable content to burnable vehicle ranging from about 1:1 to 6:1. Except for the presence of the SnO, such silver coating compositions are well known and commonly employed for the production on ceramic bodies of fired-on silver electrodes. The burnable vehicle generally contains or consists essentially of a binder having film-forming properties and serving to impart bonding, adhesive, viscosity, and dispersing properties to the composition. As examples of suitable binders, there may be mentioned one or a mixture of waxes, wax-like substances, cellulose derivatives such as ethyl cellulose, shellac, rosin and rosin derivatives, natural and synthetic resins of thermoplastic or thermosetting type such as alkyds, vinyls, acrylics, polypynolidone, polyvinylpyrrolidone, nylons, and the like. A small amount of natural or synthetic dispersing or suspending agent may be included such as lecithin, phosphorated tall oil, and the like.

The silver coating composition may be of the "air dry" type in which the unburnable solids content is dispersed in a vehicle comprising a binder and a volatile solvent such as terpenes including terpineol, pine oil, turpentine, and the like, petroleum or hydro-carbon solvents, butyl lactate, butyl carbitol acetate, and the like, and mixtures thereof. Such "air dry" compositions are pasty or liquid at ordinary temperatures, and are solidified after application to a surface of the ceramic body by volatilization or drying of the solvent in air, a dryer or in a furnace.

Since "air dry" silver compositions must be dried or fired on the ceramic body before the reverse side of the body can be coated with another silver electrode for producing conventional capacitors and the like, "hot melt" type silver compositions have been developed which eliminate this intermediate drying or firing step. In these compositions, the vehicle is devoid of volatile solvents of the above-described type, being composed essentially of one or a mixture of binders solid at ordinary temperatures but melting within the range of about 120 to 230° F. Such compositions are accordingly pastes or paints at these higher temperatures, and when so applied through a heated screen stencil or otherwise in known manner to a surface of the ceramic body held at ordinary temperature, solidify almost instantly upon contact to provide a firm, solid, adherent coating thereon which requires no drying or firing before application to the reverse side of the ceramic body of either an "air dry" or "hot melt" type silver coating composition. Reference is here made to U.S. Patent No. 2,694,016 for a disclosure of suitable silver coating compositions of both types which are operative herein after intimate admixture therewith of about 3 to 30% of SnO in finely divided form by weight of the silver therein. If desired, a finely divided low-melting point glass flux such as lead borosilicate or bismuth lead borosilicate may be included in these compositions in amounts given above to improve adherence of the fired-on silver coating to the surface of the ceramic body.

These silver coating compositions may be applied to the ceramic bodies by a number of known techniques, including painting, spraying, bonding in the form of a previously formed self-sustaining film, or preferably by the silk-screen or squeegee method, after which the coated ceramic bodies are fired, usually at temperatures within the range of about 1100 to 1600° F. and in air or nitrogen or the like, during which the burnable vehicle is removed and improved fired-on silver electrodes are formed in accordance with this invention.

It is a further feature of this invention that, in contrast to prevailing experience, the higher capacitances and other improved properties of the resulting capacitors are obtained regardless of the electrode-firing conditions of temperature and the like, whereby the usual means and expedients required for control of critical firing temperatures may be dispensed with.

During the firing of the silver coating compositions of the present invention, the stannous oxide therein is oxidized to stannic oxide so that the fired-on silver electrode contains $SnO_2$ instead of SnO. Capacitors produced in accordance with this invention unexpectedly have tremendously improved (higher) capacitances, and low power factors, as compared with similar capacitors made with silver electrodes devoid of $SnO_2$, and it is postulated that these improved results may be due in specific instances to the presence of SnO in the silver electrode being fired which retards the rate of re-oxidation of the reduced titanate in the base ceramic body while being itself oxidized to $SnO_2$.

It will be understood that the electrical capacitors of the present invention are provided with at least two electrodes, at least one of which consists essentially of silver containing $SnO_2$ as described above. In accordance with the preferred embodiment, such capacitors are comprised of a body of high dielectric ceramic material composed predominantly of reduced barium titanate, two opposed (preferably parallel) surfaces of which are provided with electrodes at least one of which consists essentially of silver containing $SnO_2$ as described above. Less preferably, such surfaces need not be opposed and may in fact rest separately in the same plane. Also more than two distinct surfaces may be provided with electrodes, at least one being $SnO_2$-containing silver.

The following exemplary description is concerned with the application of the teachings of the present invention in the production of conventional capacitors, although the invention is also operative in the known methods, means and techniques for producing other types of ceramic electrical components. All parts and proportions referred to herein and in the appended claims are by weight unless otherwise indicated.

| Example No. | I | II | III | IV |
|---|---|---|---|---|
| | Percent | Percent | Percent | Percent |
| Barium titanate | 69.6 | 71.6 | 69.6 | |
| Strontium titanate | 8.9 | 8.9 | 8.9 | 44.5 |
| Calcium titanate | 7.9 | 7.9 | 7.9 | 44.6 |
| Magnesium zirconate | 0.7 | 0.7 | 0.7 | 2.0 |
| Barium zirconate | 11.9 | 9.9 | 11.9 | 7.9 |
| Neodymium oxide | 1.0 | 1.0 | | 1.0 |
| Cerium-free rare earth carbonates | | | 1.0 | |
| | 100 | 100 | 100 | 100 |

Each of the above compositions was mixed in powder form, desirably with the aid of a small amount of binder, pelleted into thin discs of about 0.700 inch diameter and fired to maturity in air at about 2450° F. for about ½ hour, and then refired in a hydrogen atmosphere at about 2450° F. for about ½ hour. The resulting high dielectric ceramic discs composed predominantly of reduced alkaline earth titanate, cooled to room temperature, were each coated with a centered 0.500″ diam. spot of hot-melt type silver coating composition by the squeegee method using silk screens kept sufficiently hot to maintain the composition in pasty or fluid condition. The silver coating solidified instantly on the discs, which were then similarly coated on the reverse side with an air-dry type silver coating composition. The coated discs were then fired in a furnace on a stainless steel screen at about 1450° F. for about 15 minutes. The resulting capacitors had unexpectedly improved electrical properties, as compared with capacitors having fired-on silver electrodes devoid of SnO, particularly with respect to increased capacitances and low power factor.

Both the above hot-melt and air-dry silver coating compositions were prepared by intimately mixing about 0.75 part of finely divided SnO with 20 parts of coating composition containing 50.3% of finely divided silver of about 325 mesh, 6.0% of a finely divided lead borosilicate glass flux (79% $PbO$, 11% $B_2O_3$ and 10% $SiO_2$) and 43.7% of vehicle. The hot-melt vehicle consisted of 47.61% hydrogenated rosin, 47.61% paraffin, 2.86% ethyl cellulose having an ethoxy content of 49–50% and a viscosity of 200 cps., 1.90% phosphorated tall oil and 0.02% pyrogallic acid. The air-dry vehicle consisted of 83.98% butyl lactate and 16.02% ethyl cellulose having an ethoxy content of 49–50% and a viscosity of 200 cps.

This invention has been disclosed with respect to certain preferred embodiments, and various modifications and variations thereof will become obvious to persons skilled in the art which are intended to be included within the spirit and purview of this application and the scope of the appended claims.

What is claimed is:

1. An electrical component of high dielectric ceramic material composed predominantly of alkaline earth titanate, at least two distinct surfaces of which are provided with electrodes at least one of which consists essentially of silver and about 3 to 30% of $SnO_2$ by weight of the silver.

2. An electrical component of high dielectric ceramic material composed predominantly of barium titanate, at least two distinct surfaces of which are provided with electrodes at least one of which consists essentially of silver and about 3 to 30% of $SnO_2$ by weight of the silver.

3. An electrical component of high dielectric ceramic material composed predominantly of reduced alkaline earth titanate, at least two distinct surfaces of which are provided with electrodes at least one of which consists essentially of silver and about 3 to 30% of $SnO_2$ by weight of the silver.

4. An electrical component of high dielectric ceramic material composed predominantly of reduced barium titanate, at least two distinct surfaces of which are provided with electrodes at least one of which consists essentially of silver and about 3 to 30% of $SnO_2$ by weight of the silver.

5. A capacitor of high dielectric ceramic material composed predominantly of alkaline earth titanate, to two distinct surfaces of which are secured electrodes consisting essentially of silver and about 3 to 30% of $SnO_2$ by weight of the silver.

6. A capacitor of high dielectric ceramic material composed predominantly of barium titanate, to two distinct surfaces of which are secured electrodes consisting essentially of silver and about 3 to 30% of $SnO_2$ by weight of the silver.

7. A capacitor of high dielectric ceramic material composed predominantly of reduced alkaline earth titanate, to two distinct surfaces of which are secured electrodes consisting essentially of silver and about 3 to 30% of $SnO_2$ by weight of the silver.

8. A capacitor including a body composed predominantly of reduced barium titanate, to two opposed surfaces of which are secured electrodes consisting essentially of silver and about 3 to 30% of $SnO_2$ by weight of the silver.

9. A method comprising firing on at least one surface of a body of high dielectric ceramic material composed predominantly of reduced alkaline earth titanate a composition containing as its essential unburnable constituents silver and about 3 to 30% of SnO by weight of the silver.

10. A method comprising firing on at least one surface of a body of high dielectric ceramic material composed predominantly of reduced barium titanate a composition containing as its essential unburnable constituents silver and about 3 to 30% of SnO by weight of the silver.

11. A method comprising firing on two distinct surfaces of a body of high dielectric ceramic material composed predominantly of reduced alkaline earth titanate a composition containing as its essential unburnable constituents silver and about 3 to 30% of SnO by weight of the silver.

12. A method comprising firing on two distinct surfaces of a body of high dielectric ceramic material composed predominantly of reduced barium titanate a composition containing as its essential unburnable constituents silver and about 3 to 30% of SnO by weight of the silver.

13. A silver coating composition containing as its essential unburnable constituents finely divided silver and about 3 to 30% of finely divided SnO by weight of the silver.

14. A silver coating composition containing an unburnable content consisting essentially of, by weight, about 80 to 100 parts of finely divided silver, about 3 to 30% of finely divided SnO by weight of the silver, and about 0 to 20 parts of finely divided glass flux, dispersed in a burnable vehicle, the weight ratio of unburnable content to burnable vehicle ranging from about 1:1 to 6:1.

15. A method of making a capacitor comprising the steps of coating two surfaces of a body of reduced alkaline earth titanate with a composition of silver in a vehicle containing about 3 to 30% of SnO by weight of the silver and firing said coated body.

16. The method in accordance with claim 15 wherein said body incorporates about 1% of rare earth oxide.

17. A method of making a capacitor which includes the steps of coating two surfaces of a ceramic body of reduced alkaline earth titanate containing about 1% rare earth oxide with a composition of silver and glass flux in a vehicle and about 3 to 30% SnO by weight of silver, and firing the coated body to convert the composition to respective electrodes.

18. A capacitor including a body of ceramic material and two spaced-apart electrodes thereon, resulting from firing on two distinct surfaces of a body of high dielectric ceramic material composed predominantly of reduced alkaline earth titanate, a composition containing as its essential unburnable constituents silver and about 3 to 30% of SnO by weight of the silver.

19. A capacitor including a body of ceramic material and two spaced-apart electrodes thereon, resulting from firing on two distinct surfaces of a body of high dielectric ceramic material composed predominantly of reduced barium titanate and 1% rare earth oxide, a composition containing as its essential unburnable constituents silver and about 3 to 30% of SnO by weight of the silver.

References Cited by the Examiner

UNITED STATES PATENTS

| | | | |
|---|---|---|---|
| 2,429,089 | 10/1947 | Box | 317—258 |
| 2,486,341 | 10/1949 | Stumbock | 252—341 X |
| 2,633,543 | 3/1953 | Howatt | 317—258 X |
| 2,972,570 | 2/1961 | Haas et al. | 317—258 |

JOHN F. BURNS, *Primary Examiner.*